United States Patent
Carlsten et al.

(10) Patent No.: US 11,168,399 B2
(45) Date of Patent: Nov. 9, 2021

(54) POLYMER-METAL COMPOSITE STRUCTURAL COMPONENT

(71) Applicant: Raytheon Company, Waltham, MA (US)

(72) Inventors: Curtis B. Carlsten, Seekonk, MA (US); Jonathan Murrow, Tucson, AZ (US); Erik F. Item, W Barnstable, MA (US)

(73) Assignee: Raytheon Company, Waltham, MA (US)

( * ) Notice: Subject to any disclaimer, the term of this patent is extended or adjusted under 35 U.S.C. 154(b) by 426 days.

(21) Appl. No.: 15/920,391

(22) Filed: Mar. 13, 2018

(65) Prior Publication Data

US 2018/0265985 A1 Sep. 20, 2018

Related U.S. Application Data

(62) Division of application No. 14/557,286, filed on Dec. 1, 2014, now Pat. No. 9,920,429.

(51) Int. Cl.
  *B32B 37/16* (2006.01)
  *B63B 3/16* (2006.01)
  (Continued)

(52) U.S. Cl.
  CPC .......... *C23C 18/1616* (2013.01); *B32B 37/16* (2013.01); *B63B 3/16* (2013.01);
  (Continued)

(58) Field of Classification Search
  None
  See application file for complete search history.

(56) References Cited

U.S. PATENT DOCUMENTS 3,395,046 A 7/1968 Levine et al.
3,701,548 A 10/1972 McGuire
(Continued)

FOREIGN PATENT DOCUMENTS

DE 4214279 A1 11/1993
GB 2032877 A 5/1980
(Continued)

OTHER PUBLICATIONS

Carlsten, Curtis B. et al., U.S. Appl. No. 14/557,404, filed Dec. 1, 2014.
(Continued)

*Primary Examiner* — Aaron Austin
*Assistant Examiner* — Michael C Romanowski

(57) ABSTRACT

A composite structural component is disclosed. The composite structural component can include a lattice structure, a casing disposed about at least a portion of the lattice structure, and a skin adhered to a surface of the casing. The lattice structure and the casing can be formed of a polymeric material and the skin can be formed of a metallic material. A method of manufacturing a composite structural component is disclosed. The method can include creating a casing of a polymeric material and creating a lattice structure of a polymeric material disposed about at least a portion of the casing. The method can include sealing the porosity of the casing and lattice structure. The method can include adhering a skin of a metallic material to at least a portion of the casing. At least one of creating a lattice structure and creating a casing comprises utilizing an additive manufacturing process.

14 Claims, 5 Drawing Sheets

(51) Int. Cl.
| | | |
|---|---|---|
| *C23C 18/08* | (2006.01) | |
| *F42B 10/00* | (2006.01) | |
| *F42B 12/76* | (2006.01) | |
| *C23C 18/16* | (2006.01) | |
| *B64C 1/00* | (2006.01) | |
| *F42B 10/14* | (2006.01) | |

(52) U.S. Cl.
CPC ............... *B64C 1/00* (2013.01); *C23C 18/08* (2013.01); *C23C 18/16* (2013.01); *C23C 18/1601* (2013.01); *C23C 18/1603* (2013.01); *C23C 18/1614* (2013.01); *C23C 18/1633* (2013.01); *C23C 18/1639* (2013.01); *C23C 18/1641* (2013.01); *F42B 10/143* (2013.01); *F42B 12/76* (2013.01); *B64C 2001/0072* (2013.01)

(56) References Cited

U.S. PATENT DOCUMENTS

| | | |
|---|---|---|
| 3,996,402 A | 12/1976 | Sindt |
| 4,132,331 A | 1/1979 | Mägerle |
| 5,770,296 A | 6/1998 | Remerowski et al. |
| 5,919,387 A | 7/1999 | Buckley et al. |
| 6,170,560 B1 | 1/2001 | Daily et al. |
| 6,193,834 B1 | 2/2001 | Smith |
| 6,312,548 B1 | 11/2001 | Fathi et al. |
| 7,608,672 B2 | 10/2009 | Hachikian |
| 7,851,062 B2 | 12/2010 | Hales et al. |
| 8,573,289 B1 * | 11/2013 | Roper .................... F28D 15/04 165/164 |
| 8,579,018 B1 * | 11/2013 | Roper ................ H05K 7/20336 165/104.26 |
| 9,546,826 B1 * | 1/2017 | Carter ................... F28D 15/046 |
| 2003/0201186 A1 | 10/2003 | Lee et al. |
| 2008/0302476 A1 | 12/2008 | Bommi et al. |
| 2009/0045286 A1 | 2/2009 | King et al. |
| 2010/0206418 A1 | 8/2010 | Wolf et al. |
| 2011/0281082 A1 | 11/2011 | Wilson |
| 2012/0144715 A1 | 6/2012 | Simpson |
| 2013/0143060 A1 * | 6/2013 | Jacobsen ............. B29C 35/0894 428/594 |
| 2013/0224008 A1 | 8/2013 | Cheung et al. |
| 2014/0113104 A1 | 4/2014 | Rozant et al. |
| 2014/0349213 A1 | 11/2014 | Pintauro et al. |
| 2016/0145850 A1 | 5/2016 | Cook et al. |

FOREIGN PATENT DOCUMENTS

| | | |
|---|---|---|
| GB | 2187703 A | 9/1987 |
| WO | WO 2012/003026 A2 | 1/2012 |
| WO | WO 2014/095872 A1 | 6/2014 |
| WO | WO 2015/006406 A1 | 1/2015 |

OTHER PUBLICATIONS

Merriam-Webster, Pore, merrian-webster.com, n. d. web Jul. 23, 2017.

* cited by examiner

POLYMER-METAL COMPOSITE STRUCTURAL COMPONENT

RELATED APPLICATIONS

This is a divisional application of U.S. application Ser. No. 14/557,286, filed Dec. 1, 2014, entitled "Method for Manufacturing Polymer-Metal Composite Structural Component," which is incorporated by reference in its entirety herein.

BACKGROUND

Lightweight structures are key performance drivers for many design applications, such as unmanned vehicles (i.e., air, ground, surface, and/or underwater vehicles). Structures that can mimic the strength of metal alloys at reduced weights are highly desired. One such structure that is widely known is fiber-reinforced polymer (FRP) composite.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
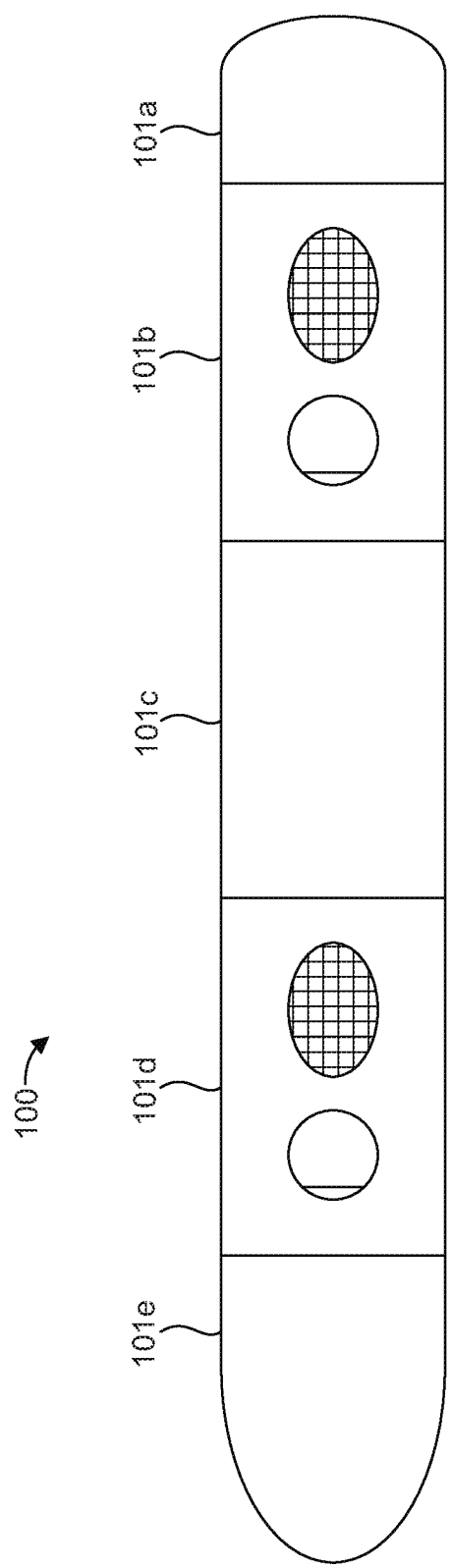
FIG. 1 is an illustration of a composite structural assembly in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Many applications, such as unmanned vehicles, utilize complex 3D geometries, which limits applicable fabrication processes as well as the ability of the processes to provide lightweight structures. For example, although FRP composite can be used to construct lightweight structures, it is limited by the complexity of 3D geometries it can embody. Additionally, although some structures can be made to accurately represent virtually any 3D geometry (i.e., to demonstrate functionality of prototypes), such structures may not suitable for production use. For example, prior structures fabricated by additive manufacturing are notoriously weak and prone to failure when subjected to operating loads or other environmental conditions. For these reasons, typical additive manufacturing structures have limited, if any, applicability to devices such as unmanned vehicles. Thus, many applications exist for structures that can provide the strength of metal parts at reduced weights and that can be constructed in complex 3D geometries.

Accordingly, a composite plastic/metal structural component is disclosed that can provide lightweight parts with metal-like strength that can be constructed in virtually any 3D geometry. In one aspect, the composite structural component comprises an additively manufactured polymer based part. The composite structural component can include a lattice structure, a casing located about at least a portion of the lattice structure to structurally enhance the lattice structure, and a skin adhered to a surface of the casing (and/or the lattice structure itself). The lattice structure and the casing can be formed of a polymeric material and the skin formed of a metallic material.

In one aspect, a composite structural assembly is disclosed. The composite structural assembly can include a first composite structural component and a second composite structural component coupled to one another. Each of the first and second composite structural components can have a lattice structure, a casing located about at least a portion of the lattice structure, and a skin adhered to a portion (e.g., surface) of the casing and/or a portion (e.g., surface) of the lattice structure. The lattice structure and the casing can be formed of a polymeric material and the skin formed of a metallic material.

One example of a composite structural assembly 100 is illustrated in FIG. 1. The composite structural assembly 100 can comprise any number of composite structural components 101a-e coupled or otherwise secured to one another. In one example, the composite structural components 101a-e of the composite structural assembly 100 can form at least a portion of an unmanned underwater vehicle (UUV) (e.g., mine neutralizer), as shown, or any other suitable vehicle or device, such as a missile. In a particular aspect, the principles disclosed herein can provide a composite structure and/or a composite structural assembly that can replace or substitute a part traditionally constructed of metal for use in a harsh environment, such as underwater or in space. Despite these examples, those skilled in the art will recognize the many different applications that this technology can be applied to, and that the examples identified herein are not meant to be limiting in any way. Essentially, those skilled in the art will recognize that the present invention technology can be applied in a variety of disciplines and to a variety of applications where a structural component is to be utilized and where additive manufacturing of a combination plastic casing and lattice structure, as taught herein, can be employed to replace what traditionally has been made with metal.

Figure 2:
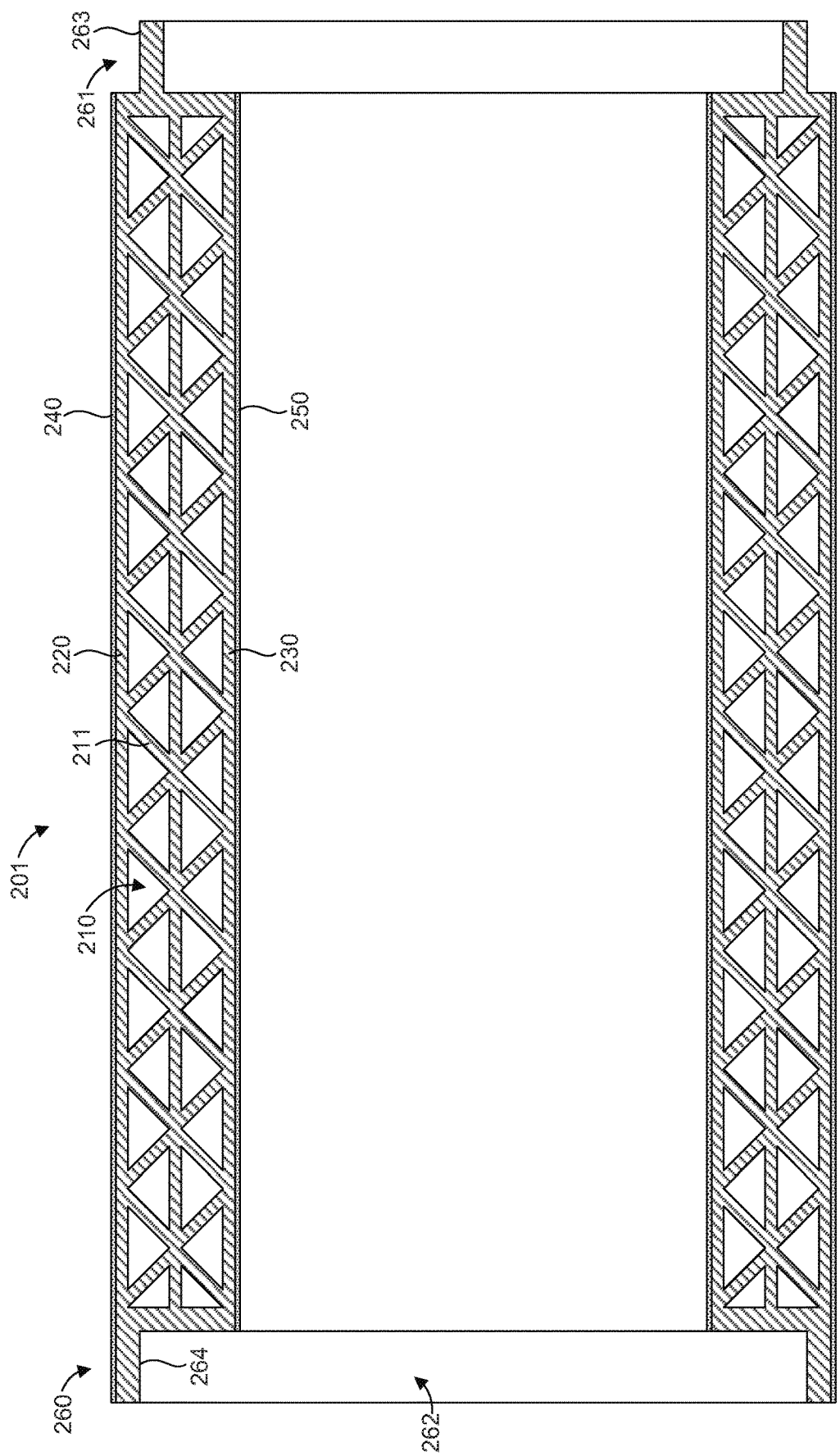
FIG. 2 is a schematic cross-sectional view of a composite structural component in accordance with an example of the present disclosure.

FIG. 2 is a schematic cross-sectional view of a composite structural component 201, such as may be included in the composite structural assembly 100 of FIG. 1. The composite structural component 201 can include a lattice structure 210, having a plurality of struts 211, and one or more casings 220, 230 disposed about at least a portion of the lattice structure 210 for structurally enhancing the lattice structure 210. For example, as shown in the figure, the casings 220, 230 can be disposed or located about the lattice structure opposite one another. The casings 220, 230 can define an exterior and/or an interior of the composite structural component 201 and, therefore, of a composite structural assembly having a void to be filled at least partially with the lattice structure 210 in an additive process based on the combined casing/lattice assembly in the CAD or electronic model. For example, as shown in the figure, the casing 220 can define an exterior and the casing 230 can define an interior of the structural component 201. Although the casings 220, 230 are illustrated as having cylindrical configurations, the casings 220, 230 can be of any suitable configuration or geometry. In one aspect, the casings 220, 230 can define a void or region or a space envelope between the casings 220, 230 and the lattice structure 210 can be caused to fill or conform to the void or region or space envelope. Thus, the lattice structure 210 boundaries can be of any shape and the lattice structure 210, using the additive manufacturing techniques discussed herein, can fill geometries having regular or irregular volumes, which can enable the construction of geometries not possible by classic or prior composite technologies. The casings 220, 230 can therefore define a size and/or shape of the composite structural component 201, with the lattice structure conforming, at least partially, with such size and/or shape. The lattice structure 210, along with the casings 220, 230, can provide structural integrity or support for the composite structural component 201.

In one aspect, the lattice structure 210 and the casings 220, 230 can be utilized to reduce or minimize the weight of the composite structural component 201. Accordingly, the lattice structure 210 and/or the casings 220, 230 can be formed of relatively lightweight structural materials, such as polymeric materials, to provide a high strength to weight ratio. Suitable polymeric materials can include nylon (i.e., glass-filled nylon, carbon-filled nylon, Nylon 11, Nylon 12, PEEK, PEKK, etc.), their glass or carbon filled variants, etc.

In one aspect, the lattice structure 210 and/or the casings 220, 230 can be constructed using an additive manufacturing process, such as selective laser sintering (SLS), selective laser melting (SLM), fused deposition modeling (FDM), stereolithography (SLA), laminated object manufacturing (LOM), and/or any other suitable type of additive manufacturing process for polymeric materials. Utilizing an additive manufacturing process can therefore facilitate integrally forming the lattice structure and the casing with one another, although the lattice structure and the casing can be distinct from one another.

In addition, the composite structural component 201 can include a skin adhered to a surface of the casing 220 and/or the casing 230. For example, a skin 240 can be adhered to a surface of the casing 220 and a skin 250 can be adhered to a surface of the casing 230. The skin 240, 250 can be formed of a metallic material, thereby forming a composite structure with the polymeric material (e.g., an additive manufactured composite). In one aspect, the skin can be formed of a relatively stiff metallic material to increase the stiffness of the composite structural component 201. For example, in some cases, the addition of a metal skin can increase the stiffness of a composite structural component by a factor of ten over a polymer lattice and casing structure alone. Suitable metallic materials can include nickel, electroless nickel, etc. Other metal alloys that can be applicable via plating and/or other metal deposition processes include, but are not limited to, aluminum alloys, and stainless steels, which cover a wide spectrum of various elemental constituents. The desired properties are high stiffness, corrosion resistance, impact and abrasion resistance, and suitability for the metallization process, which in turn yields acceptable surface finish, uniform thickness, and bond strength to the substrate.

The stiffness of the composite structural component 201 can be tailored for a given loading condition by altering the thicknesses of the lattice struts 211, diameters of the lattice struts, separation of the lattice struts from one another, the densities of the struts, thicknesses of the skins 240, 250, the separation of the skins from one another, the material of the skins, etc. The combination of the lightweight polymer lattice structure and casings with metal skins about the casings can therefore facilitate reduced or minimized weight while providing adequate strength. The skin can also provide corrosion resistance, such as in a water environment.

In one aspect, the skin can be plated on the surfaces of the casings 220, 230. The surfaces of the casings 220, 230 can be plated with metallic material utilizing an electrolytic plating process and/or an electroless plating processes.

For example, because the polymeric casing may be non-conductive, a surface of the casing can be activated with a palladium bath, and then electroless copper (e.g., via an electroless copper plating process) can be added to make the surface conductive to receive a metallic plating material.

Electroless plating may be more appropriate when a lattice structure is to be plated. Typically, electroless plating better accommodates deep crevices and non-line of sight features with uniform wall thicknesses. Electrolytic nickel has greater elongation properties which makes it easier to match with the lower stiffness of the polymeric substrate. The overall stiffness of a composite structure is a function of the skin thickness, among other things, as noted above. Stiffness can be balanced against weight increase as skin thickness increases. The principles disclosed herein can therefore be utilized to produce composite structural components that are highly tailorable for a given application.

Because additive manufacturing processes typically produce parts that are inherently porous, the polymeric casings 220, 230 and/or lattice structure 210 of the composite structural component 201 may need to be sealed to enable use in a particular operating environment, such as underwater. In one aspect, the porous polymeric casings 220, 230 and/or lattice structure 210 can be sealed and made waterproof utilizing any suitable sealing technology or process, such as infiltration sealing technology. For example, the casings 220, 230 and/or lattice structure 210 can be sealed by vacuum infiltration, where the casings 220, 230 and/or lattice structure 210 are evacuated by a vacuum, submersed in a resin, and removed for curing. Such as process may be automated. The sealant in the waterproof composite structural component 201 can therefore form a pressure boundary to safely house and protect electronics, payload, etc. within the composite structural component 201. In one aspect, the skin 240, 250 can provide a barrier to water. The sealant, however, can ensure watertight integrity of the composite structural component 201 if the skin 240, 250 is perforated or damaged. The principles disclosed herein can therefore combine lattice integration, infiltration or other sealing technology, and optional metal plating to provide a composite structural component that is waterproof and as strong as, but lighter than, metal. Such a component can be effectively utilized in a variety of devices, systems, etc. in a variety of applications, one exemplary application being an underwater device, such as a UUV.

The composite structural component 201 can also include coupling portions 260, 261 configured to facilitate coupling with other components. For example, the coupling portion 260 can include one or more interface portions or surfaces, such as an opening 262 defined by a flange 264 to receive a protrusion of an adjacent structural component. The coupling portion 261 can include one or more interface portions or surfaces, such as a protrusion 263 to be inserted into an opening of an adjacent structural component.

Figure 3:
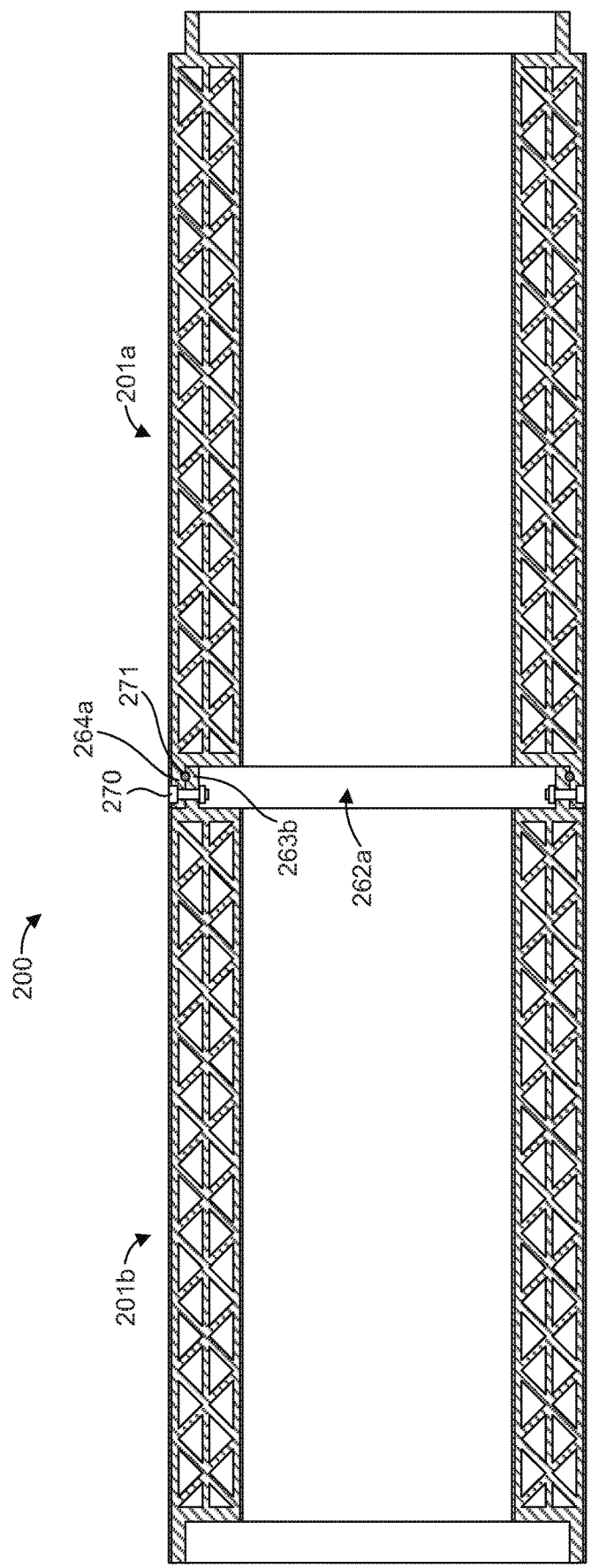
FIG. 3 is a schematic cross-sectional view of a composite structural assembly in accordance with another example of the present disclosure.

For example, as illustrated in FIG. 3, composite structural components 201a, 201b, which are similar to the composite structural component 201 of FIG. 2, may be coupled to one another by inserting a protrusion 263b of the composite structural component 201b into an opening 262a formed by a flange 264a of the composite structural component 201a. One or more fasteners 270 can extend through holes in the flange 264a and the protrusion 263b to secure the composite structural components 201a, 201b to one another. An O-ring 271 can be disposed between the flange 264a and the protrusion 263b to seal the coupling junction of the composite structural components 201a, 201b.

In one aspect, the composite structural components 201a, 201b can be coupled to one another or to another type of component in any suitable manner utilizing any suitable process. In one specific example, the composite structural components 201a, 201b can be coupled to one another without using fasteners or conventional seals, but rather by RF welding as further disclosed in copending nonprovisional U.S. patent application Ser. No. 14/557,404, filed Dec. 1, 2014, and entitled, "Coupling Components to One Another Utilizing Electromagnetic Energy," which is incorporated by reference in its entirety herein. The RF welding is suited for joining thermoplastics by reflowing the base material to result in a homogenous base material bond between parts.

Surfaces, such as joint interfaces, can be further processed (e.g., machined) to ensure a more suitable surface for RF welding. However, in other examples, to eliminate the need for machining, a secondary filler material can be used, such as a hot melt polyolefin based adhesive. This can effectively seal against water permeation.

Figure 4:
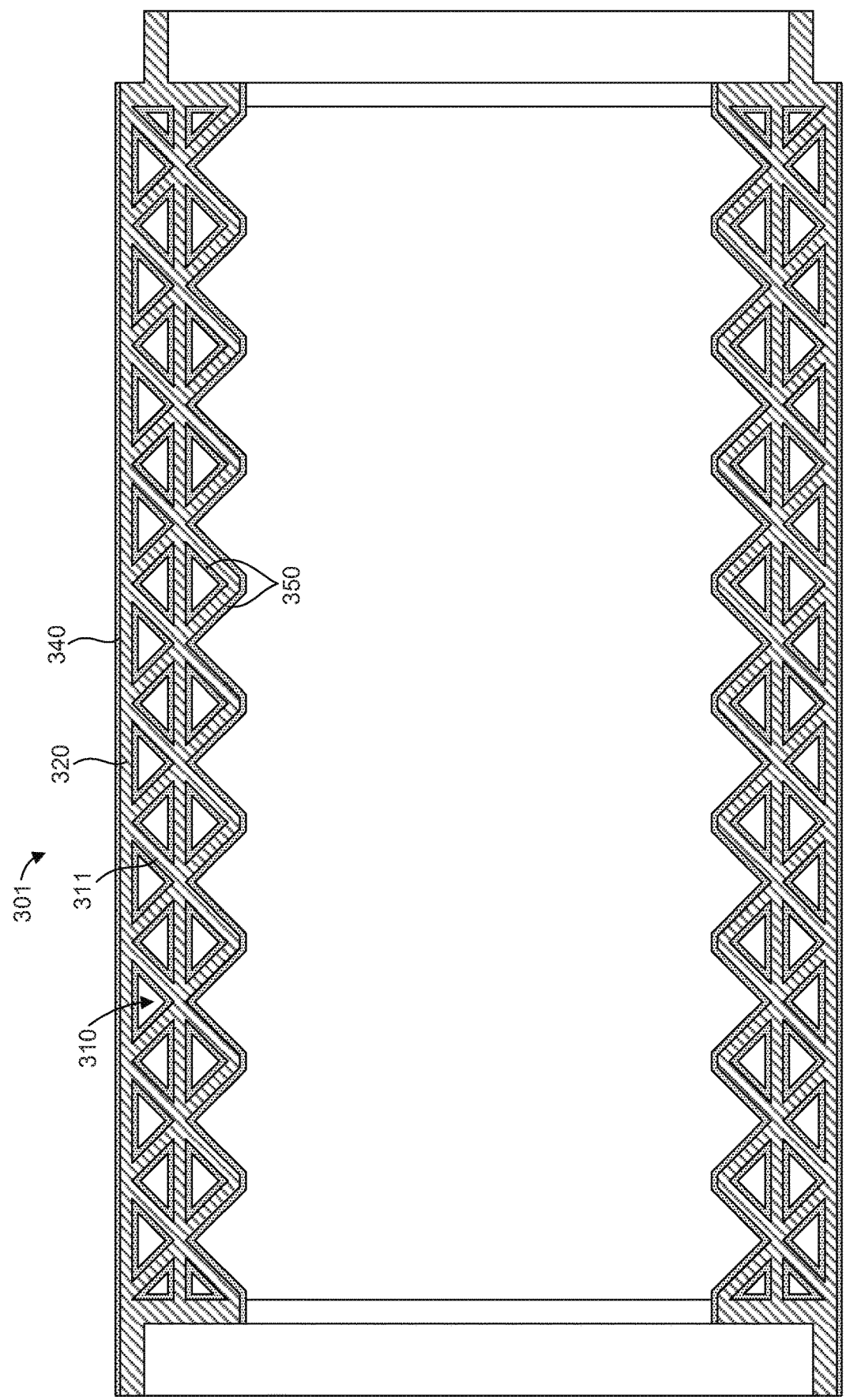
FIG. 4 is a schematic cross-sectional view of a composite structural component in accordance with another example of the present disclosure.

FIG. 4 is a schematic cross-sectional view of a composite structural component 301 in accordance with another example of the present disclosure. Certain features outside the cross-sectional plane have been omitted for clarity. The composite structural component 301 is similar in many respects to the composite structural component 201 of FIG. 2. For example, the composite structural component 301 includes a lattice structure 310, having a plurality of struts 311, at least one casing 320 located about at least a portion of the lattice structure 310, and a skin 340 adhered to a portion of the casing 320. In this case, however, a portion 350 of the skin is also adhered to at least a portion (e.g., various surfaces) of the lattice structure 310, such as the struts 311. The lattice structure 310 in this example is exposed and accessible for adherence by the skin 350, such as by a plating process, as discussed above. Adhering the skin 350 directly to the lattice structure 310 effectively metalizes the lattice structure (i.e., further structurally enhancing the lattice structure by adhering metal to select portions of the lattice structure), which can provide enhanced stiffness for the composite structural component 301. In some cases, the metalized lattice structure can provide the composite structural component 301 with suitable stiffness properties, such that a second casing is not needed (e.g., eliminating one of the casings illustrated in FIG. 2). Although no casing defines a boundary for the exposed portion of the lattice structure 310, the lattice structure 310 can conform to a boundary in the exposed region.

Figure 5:
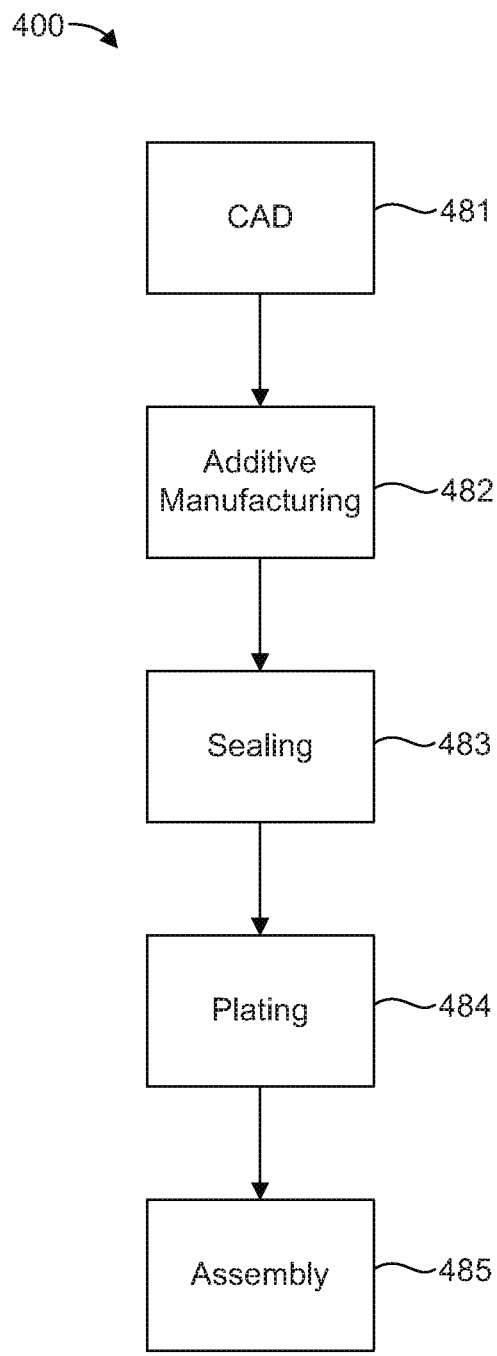
FIG. 5 is schematic diagram outlining a general process that can be used for designing and manufacturing a composite structural component and assembly in accordance with an example of the present disclosure.

FIG. 5 is a schematic illustration outlining a general process that can be used for designing and manufacturing a composite structural component and assembly. Initially, a lattice structure can be incorporated into a 3D CAD part model 481 utilizing "lattice" software. In one aspect, a lattice structure can be added to predefined part geometry. Example geometries can include cylindrical, planar, curved, random, angled, and any a combination of these as will be recognized by those skilled in the art. Thus, the lattice structure can "conform" to any part geometry and can be configured to fill any available gap or space in order to provide suitable strength and/or stiffness for the final composite structure. The lattice structure can be optimized in terms of configuration, location, etc. to handle predefined structural loads and can be validated by Finite Element Analysis (FEA). The CAD part model geometry with lattice structure can be designed in accordance with restrictions/limitations of the intended additive manufacturing process (e.g., lattice strut diameter, minimum wall thickness, etc.). In one aspect, the lattice structure can allow a plastic part to replace a metal part by maintaining dimensions comparable to the metal part.

Once the part has been designed, the part can be manufactured utilizing a suitable additive manufacturing process 482. Because composite parts may be used as substitutes for metal parts for a particular application, the additive manufacturing process can utilize polymeric materials, such as nylon, as discussed above, along with suitable resins to form the lattice. It should be recognized, however, that metallic materials can be utilized in the additive manufacturing process.

Parts fabricated via some additive manufacturing processes can result in geometries that are inherently porous and therefore unable to prevent water permeation. Water permeation in plastic varies relative to polymer chemistry as well as resulting porosity of the additive manufacturing part build. Water permeation may cause degradation of polymer structure over time. Additionally, undesirable results are experienced when water sensitive hardware and electronics on the dry-side of a pressure bulkhead are exposed to water.

Accordingly, the parts can be optionally sealed 483 to reduce water permeation to negligible/acceptable levels in cases where water permeation poses a concern. Any suitable sealant or epoxy can be utilized and can be applied via any suitable process, such as the vacuum impregnation process described above.

The final structural enhancement of the part can comprise the addition of a stiff, thin metallic (i.e., nickel) skin layer, such as by plating 484, to the polymeric structure. The result is a composite plastic/metal structure that can provide orders of magnitude increases in stiffness over the plastic structure alone. Depending on the part design, the lattice structure may or may not be plated. Parts with plated lattice structures can further increase the part stiffness. Electroless and/or electrolytic plating processes can be employed, as discussed above.

Once the parts have been completed, they can be assembled 485 or otherwise coupled to one another, as described above.

The composite structures described herein can provide several benefits. For example, due to the nature of the additive manufacturing process, the lightweight composite structures can be applied to complex 3D geometries not achievable by any other fabrication process. Virtually any 3D geometry can therefore be designed and fabricated with structural properties that replicate wholly metal structures while reducing overall part weight. This enables designers to fully leverage the positive attributes of additive manufacturing, in that anything that can be designed in a 3D CAD environment can also be fabricated in a physical sense. Thus, additive manufacturing, which has previously only been suitable for "rapid prototyping" due to the low strength of the parts, can now be used to provide final production parts. The present technology can therefore be used to replace typical metal parts and fabrication processes with polymer additive manufacturing processes. In addition, the technology disclosed herein can provide "quick turnaround" designs that allow for a rapid response to varying end user needs. This eliminates expensive and/or long lead times associated with other manufacturing processes, such as casting or forming composite layups. The present technology is also scalable to create parts of various sizes, as well as applicable to a wide variety of parts and devices, which may operate in harsh environments, such as underwater or in space.

In accordance with one embodiment of the present invention, a method of manufacturing a composite structural component is disclosed. The method can comprise creating a lattice structure of a polymeric material. The method can further comprise creating a casing of a polymeric material disposed about at least a portion of the lattice structure. Additionally, the method can comprise adhering a skin of a metallic material to a surface of the casing. It is noted that no specific order is required in this method, though generally in one embodiment, these method steps can be carried out sequentially.

In one aspect of the method, at least one of creating a lattice structure and creating a casing can comprise utilizing an additive manufacturing process. In a particular aspect, the additive manufacturing process can comprise selective laser sintering (SLS), selective laser melting (SLM), fused deposition modeling (FDM), stereolithography (SLA), laminated object manufacturing (LOM), or combinations thereof.

In one aspect of the method, adhering a skin of a metallic material to a surface of the casing can comprise plating the surface with the metallic material. In a particular aspect, plating the surface with the metallic material can comprise utilizing at least one of an electrolytic plating process and an electroless plating processes.

In one aspect, the method can further comprise creating a second casing opposite the first casing, wherein the first and second casings define a void, and wherein at least a portion of the lattice structure is disposed about the second casing (and the first). In a particular aspect, creating a second lattice structure can comprise utilizing an additive manufacturing process.

In one aspect, the method can further comprise adhering a portion of the skin to a surface of the second casing. In another aspect, the method can further comprise adhering a portion of the skin to a portion (e.g., a surface) of the lattice structure to provide a metalized lattice structure.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A composite structural component, comprising:
   a lattice structure including a plurality of struts exhibiting a three-dimensional geometry and void spaces among the struts;
   a casing disposed about at least a portion of the lattice structure, wherein the lattice structure conforms to the casing;
   a skin adhered to a surface of the casing; and
   a polymeric sealant associated with the casing and the lattice structure, wherein the lattice structure and the casing are formed of a polymeric material having porosity, and the skin is formed of a metallic material, and wherein the sealant seals the porosity of the casing and the lattice structure to provide a watertight seal.

2. The composite structural component of claim 1, wherein the lattice structure and the casing are integrally formed with one another.

3. The composite structural component of claim 1, wherein the skin comprises a plating on the surface of the casing.

4. The composite structural component of claim 1, wherein the metallic material comprises nickel.

5. The composite structural component of claim 1, wherein the casing defines at least one of an exterior and an interior of the composite structural component.

6. The composite structural component of claim 1, wherein the casing comprises a cylindrical configuration.

7. The composite structural component of claim 1, further comprising a second casing disposed about at least a portion of the lattice structure opposite the first casing.

8. The composite structural component of claim 7, wherein a portion of the skin is adhered to a surface of the second casing.

9. The composite structural component of claim 7, wherein the second casing defines at least one of an exterior and an interior of the composite structural component.

10. The composite structural component of claim 1, wherein a portion of the skin is adhered to a surface of the lattice structure.

11. A composite structural assembly, comprising:
a first composite structural component and a second composite structural component coupled to one another, each of the first and second composite structural components having
a lattice structure including a plurality of struts exhibiting a three-dimensional geometry and void spaces among the struts;
a casing disposed about at least a portion of the lattice structure;
a skin adhered to a surface of the casing; and
a polymeric sealant associated with the casing and the lattice structure,
wherein the lattice structure and the casing are formed of a polymeric material having porosity, and the skin is formed of a metallic material, and
wherein the sealant seals the porosity of the casing and the lattice structure to provide a watertight seal.

12. The assembly of claim 11, wherein the first and second composite structural components are coupled to one another with at least one fastener.

13. The assembly of claim 11, wherein the casings comprise a cylindrical configuration and define an exterior of the composite structural assembly.

14. The assembly of claim 13, wherein the composite structural assembly forms at least a portion of an unmanned underwater vehicle (UUV) or a missile.

* * * * *